United States Patent
Whitaker et al.

(10) Patent No.: US 6,929,023 B2
(45) Date of Patent: Aug. 16, 2005

(54) BACK FLOW PREVENTION DEVICE FOR PIPELINES CONVEYING FLUIDS

(75) Inventors: Kane Whitaker, Midland, TX (US); Mark Jones, Midland, TX (US)

(73) Assignee: PolyCheck Corporation, Midland, TX (US)

( * ) Notice: Subject to any disclaimer, the term of this patent is extended or adjusted under 35 U.S.C. 154(b) by 172 days.

(21) Appl. No.: 10/213,759

(22) Filed: Aug. 7, 2002

(65) Prior Publication Data

US 2004/0025944 A1 Feb. 12, 2004

(51) Int. Cl.[7] .............................................. F16K 15/06
(52) U.S. Cl. ............................. 137/315.33; 137/454.2; 137/515; 137/541
(58) Field of Search ...................... 137/315.33, 454.2, 137/515, 541

(56) References Cited

U.S. PATENT DOCUMENTS

| | | | | |
|---|---|---|---|---|
| 3,335,751 A | * | 8/1967 | Davis, Jr. ................... 137/541 |
| 3,503,518 A | * | 3/1970 | Petrucci et al. ............. 137/515 |
| 3,526,386 A |   | 9/1970 | Gachot ........................ 251/366 |
| 4,129,145 A | * | 12/1978 | Wynn .......................... 137/541 |
| 4,286,573 A | * | 9/1981 | Nickel ......................... 137/515 |
| 4,295,412 A | * | 10/1981 | Hachiro .................... 137/454.2 |
| 4,305,425 A | * | 12/1981 | Mackal et al. .............. 137/541 |
| 4,348,006 A |   | 9/1982 | Schmitt et al. ............. 251/288 |
| 4,492,249 A | * | 1/1985 | Arino et al. ................ 137/515 |
| 4,597,511 A |   | 7/1986 | Licari .......................... 222/380 |
| 4,602,655 A | * | 7/1986 | Mackal ....................... 137/515 |
| 4,653,989 A | * | 3/1987 | Mason ........................ 417/392 |
| 4,788,729 A | * | 12/1988 | Walker ........................ 137/557 |
| 4,955,407 A | * | 9/1990 | Inoue ....................... 137/454.2 |
| 5,123,591 A | * | 6/1992 | Reynolds ................. 137/454.2 |
| 5,149,054 A |   | 9/1992 | Passerell et al. ........... 251/309 |
| 5,154,396 A |   | 10/1992 | Conley et al. ............. 251/309 |
| 5,159,953 A | * | 11/1992 | Sato et al. ............... 137/454.2 |
| 5,297,576 A | * | 3/1994 | Weinheimer ................ 137/512 |
| 5,639,394 A |   | 6/1997 | Conley ........................ 219/535 |

* cited by examiner

Primary Examiner—John Rivell
(74) Attorney, Agent, or Firm—Charles D. Gunter, Jr.

(57) ABSTRACT

A back flow prevention device is shown for use in a plastic pipeline for conveying water, sewage, hydrocarbons or other fluids. A valve body features a flow control mechanism which is formed entirely or primarily of plastic materials. The valve body and its opposing ends are formed of a plastic material which is compatible with the plastic material of the existing pipeline, whereby the valve body can be installed in the pipeline in co-axially fashion by directly joining the opposing ends of the body to the opposing mating pipe ends at a selected location within the pipeline.

5 Claims, 3 Drawing Sheets

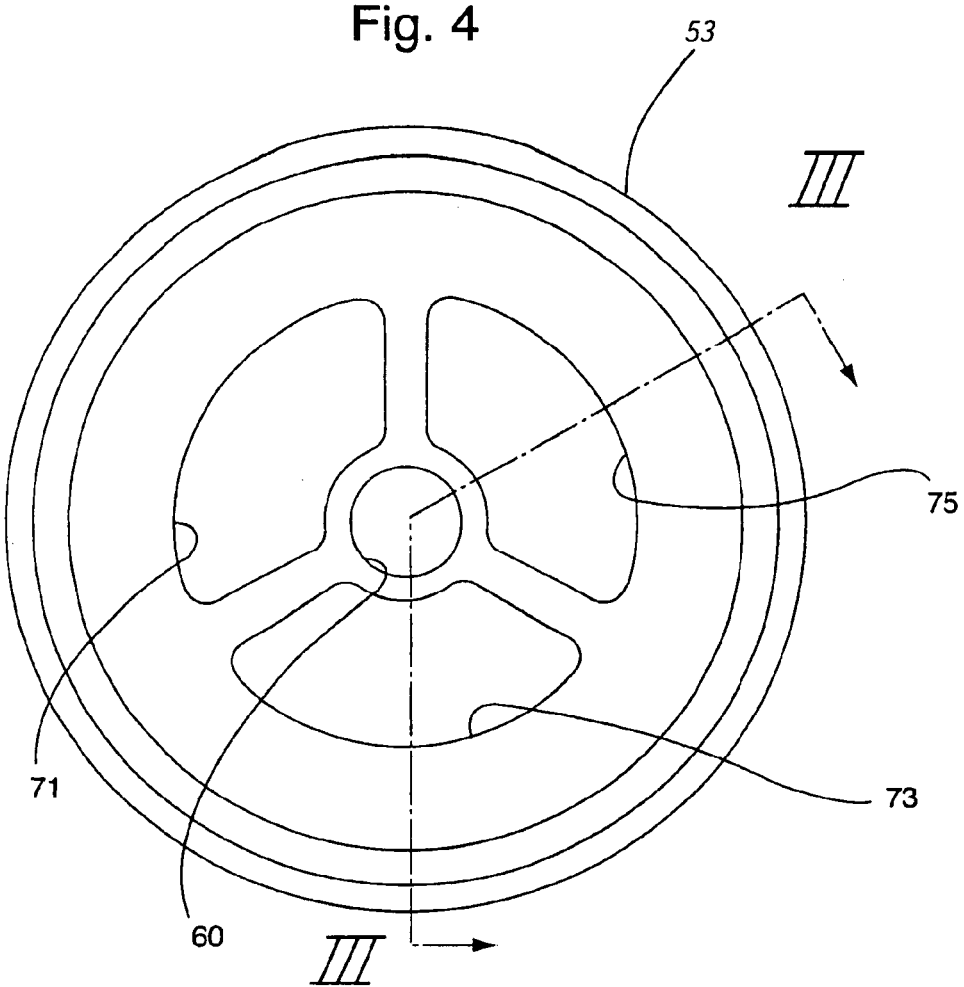
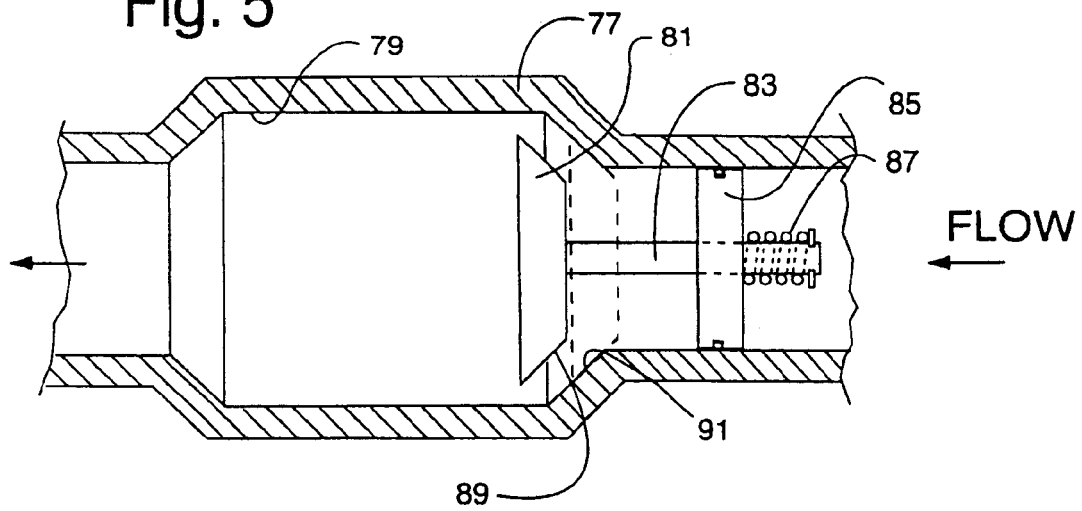

BACK FLOW PREVENTION DEVICE FOR PIPELINES CONVEYING FLUIDS

BACKGROUND OF THE INVENTION

1. Field of the Invention

The present invention relates generally to flow control devices for fluid conveying pipelines and, more specifically, to a fusable check valve made from thermoplastic materials for use as a flow control device in such pipelines.

2. Description of the Prior Art

At the present time, plastic pipe materials, particularly polyolefins such as polyethylene, are replacing iron and steel as conduits for the conveyance of fluids including water and sewage as well as hydrocarbons, natural gas and other chemical and industrial fluids. Such "plastic" pipelines have advantages over metal conduits made of iron and steel since the use of iron and steel in underground applications can lead to corrosion and deterioration of the materials.

In the case of, for example, a natural gas pipeline, polyethylene conduit can provide the advantages of corrosion resistance and durability. Polyethylene has been used in the past to not only fabricate gas pipelines but also in the fabrication of certain types of valves for controlling gas flow through the pipelines. For example, polyethylene ball valves and plug valves are commercially available for installation in gas distribution systems.

U.S. Pat. No. 5,149,054 shows a "plug" valve which is molded from a polymeric material and is utilized as a shut off valve in a gas pipeline.

U.S. Pat. No. 3,526,386 shows a valve with a body which is formed of high density polyethylene.

U.S. Pat. No. 4,348,006 shows a molded polyethylene valve body which houses a "butterfly" valve component.

U.S. Pat. No. 5,154,396 shows a polyethylene plastic valve which is said to be useful in various piping systems in a wide range of environmental conditions.

U.S. Pat. No. 5,639,394 shows a valve assembly having polyethylene valve body which is formed by electrofusing a coupling to pipe fittings.

Despite the above advances in the art, none of the cited references deal specifically with back flow prevention or "check valve" applications. In the discussion which follows, the term "check valve" will mean a valve in the purest sense which is open when upstream pressure appears and passes all flow in the normal direction without resistance but which then closes at the instant of zero flow velocity and remains closed during minor forward pressure surges and resists back pressure without leakage. Whereas other types of valves variably restrict flow volume, the check valve is normally either open or closed and not subject to external regulation. The force to open the valve comes from the upstream pressure of the fluid itself, rather than operator intervention.

Prior art check valves utilizing metal valve components for plastic pipelines have generally required a transition piece followed by the metallic valve body followed, in turn, by a nipple, union and additional transition. This added to the expense of the plastic pipeline and was labor intensive.

There remains a need for an improved check valve for plastic pipelines which overcomes the various deficiencies of the prior art devices.

SUMMARY OF THE INVENTION

A need exists for a back flow prevention device which is monolithic in nature, being formed at least primarily from the same plastic material as the material of the associated pipeline.

A need also exists for a back flow check valve which is inert and non-corrosive and which can be joined to mating pipe ends of the pipeline by butt fusion or similar techniques.

A need also exists for such a back flow prevention device which can be installed co-axially in the plastic pipeline and which can provide a full flow diameter opening in the open position.

A need also exists for a check valve mechanism formed at least primarily of plastic material which can be "press fit" within a section of the pipeline.

These and other objects are accompanied by the improved back flow prevention device. The device includes a valve body formed of a plastic material which is compatible with the plastic material of the associated pipeline. The valve body has an exterior defined between opposing ends and associated end openings. The valve body also has an initially open interior. A flow control mechanism is located within the interior of the valve body which allows flow of fluids in a first direction but which prevents the flow of fluids in a second opposite direction. The valve body with its opposing ends is formed of a plastic material which is compatible with the plastic material of the pipeline, whereby the valve body can be installed in the pipeline in co-axial fashion by directly joining the opposing ends thereof to opposing mating pipe ends at a selected location within the pipeline.

Preferably, the valve body and the pipeline are formed of a polyolefin material such as polyethylene. The valve body can be conveniently installed within the pipeline by butt fusing or electrofusing the opposing ends of the valve body to the opposing mating pipe ends at a selected location within the pipeline.

While the back flow prevention device can include a valve body which has an exterior of the same general outer diameter as the remainder of the pipeline, the device can also be provided as an insert to be installed within a section of the existing pipeline. In this case, the check valve mechanism is sized to be positioned within the interior of a selected section of the pipeline. The check valve mechanism includes a cylindrical mounting portion formed of a plastic material with a cylindrical exterior which is sized to be press fit within the cylindrical interior of the selected section of pipeline to thereby install the check valve mechanism at a desired location within the pipeline. At least the cylindrical mounting portion of the check valve mechanism is formed of a plastic material which is compatible with the plastic material of the pipeline, whereby the check valve mechanism and pipeline materials tend to expand and contract at the same general rate under the influence of temperature and pressure. After the check valve mechanism is installed within the interior of the section of pipeline, an exposed end of the pipeline section containing the check valve mechanism can be fused to the next section of pipeline in co-axial fashion.

The check valve mechanism also includes a movable valve element which cooperates with the cylindrical mounting portion of the check valve mechanism to control the flow of fluid through the pipeline. Preferably, both the movable element and the cylindrical mounting portion of the mechanism are formed of plastic materials, which are the same as, or of the same general nature as the plastic of the associated pipeline.

Additional objects, features and advantages will be apparent in the written description which follows.

BRIEF DESCRIPTION OF THE DRAWINGS

FIG. 4 is an end view of the cylindrical mounting portion of the flow control mechanism of the device of FIG. 3.

FIG. 5 is a side, partial cross-sectional view of another embodiment of the back flow prevention device showing a full opening flow diameter.

DETAILED DESCRIPTION OF THE INVENTION

Figure 1:
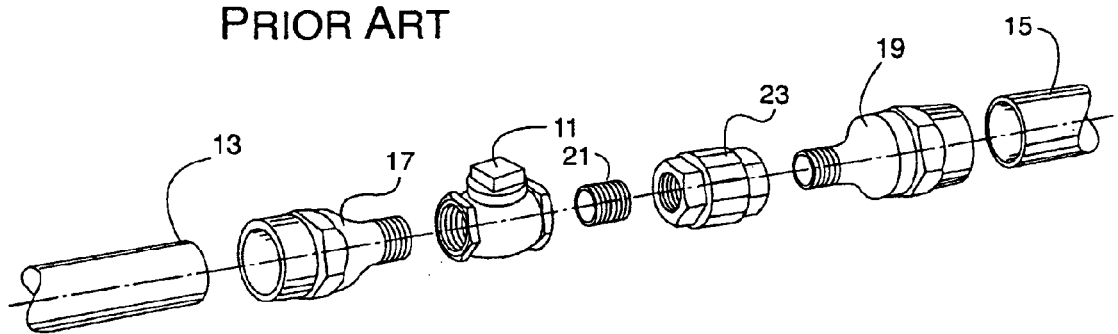
FIG. 1 shows a prior art installation in which a metallic check valve in installed within a plastic pipeline.

Turning to FIG. 1, there is shown a prior art pipeline assembly featuring a metallic ball valve 11 located between the opposing ends 13, 15 of a pipeline used to convey a fluids. The pipeline sections 13, 15 are formed of a "plastic" material. The term "plastic" as used in this discussion is intended to cover thermoplastic/thermoset materials, primarily polyolefins such as polyethylene. However, other synthetic materials such as fiberglass (FRP piping) are also envisioned. The preferred plastic material is polyethylene due to its leak free and corrosion proof characteristics.

In the prior art piping system illustrated in FIG. 1, it is necessary to provide a plastic to steel transition for the metallic ball valve 11. In the example shown, a pair of oppositely arranged transition elements 17, 19 as well as a nipple 21 and union 23 are used to effect the transition from plastic to metal. The various components illustrated in FIG. 1 are relatively expensive and the installation process is relatively labor intensive. It is also generally necessary to utilize various mechanical connectors in the installation which may be screwed, flanged, gasketed, grooved or otherwise present possible leak paths to the environment.

Figure 2A:
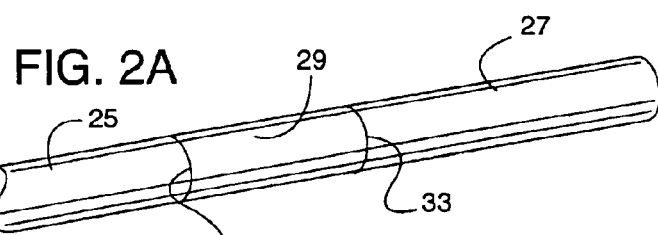
FIGS. 2A–2D are simplified views illustrating the steps in installing the back flow prevention device of the invention within an existing plastic pipeline.

FIG. 2A illustrates a method of installing the improved back flow prevention device of the invention in simplified fashion. In this case, the polyethylene pipe sections 25, 27 have a back flow prevention device 29 installed co-axially there between. The back flow prevention device 29 has a valve body which is formed of a plastic material which is compatible with the material of the pipeline sections 25, 27. The valve body can be installed in the pipeline in co-axial fashion by directing joining the opposing ends 31, 33 thereof to opposing mating pipe ends at a selected location within the pipeline. The ends 31, 33 are preferably joined by butt fusion or by an electrofusion or other conventional coupling technique.

Figure 3:
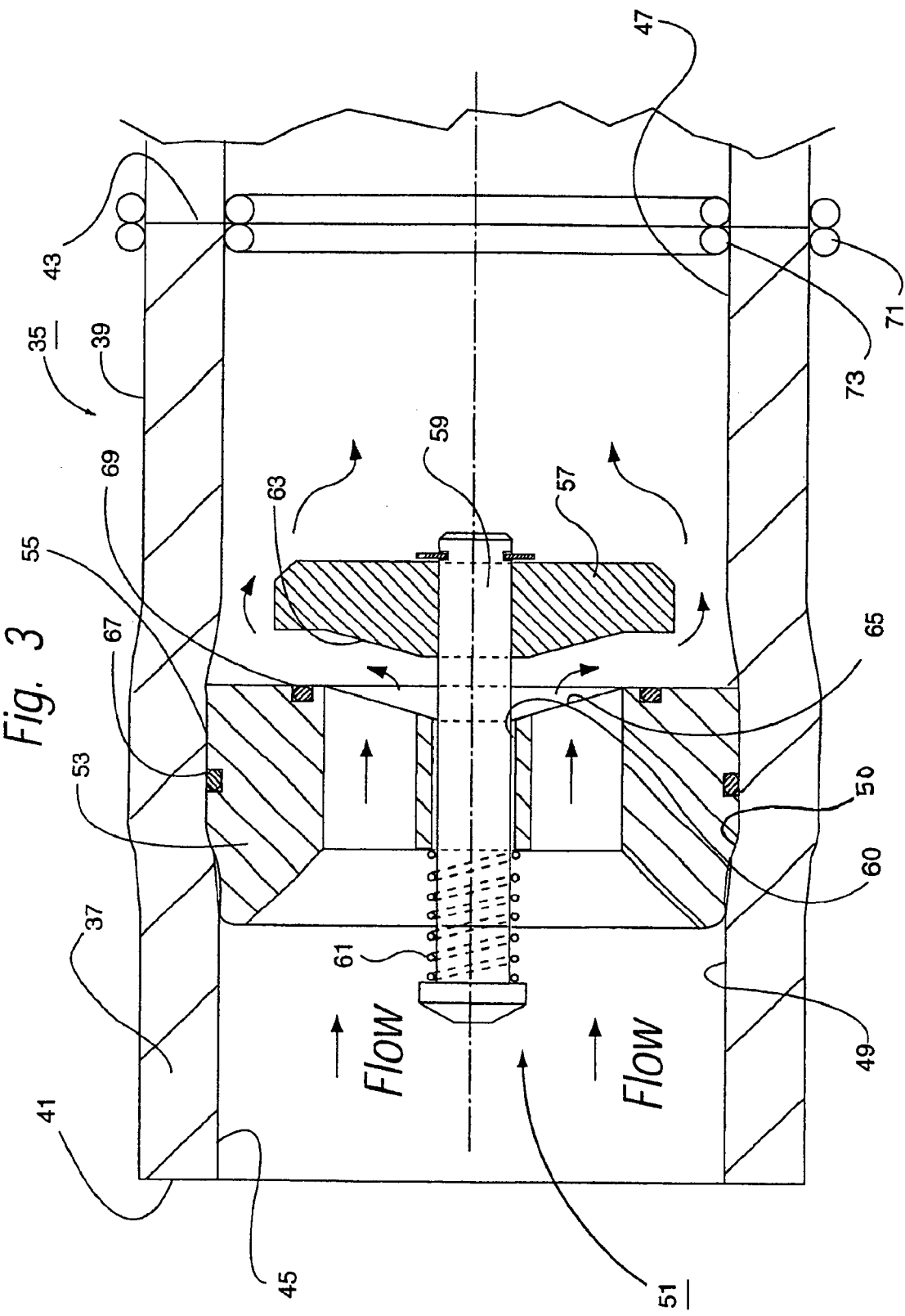
FIG. 3 is a side, partial cross-sectional view of the back flow prevention device of the invention showing the operation of the flow control mechanism thereof.

Turning to FIG. 3, there is shown one embodiment of the back flow prevention device of the invention designated generally as 35. The back flow prevention device 35 of FIG. 3 includes a valve body, in this case surrounding conduit 37, which is formed of a plastic material which is compatible with the material of the associated pipeline. The valve body has an exterior 39 defined between opposing ends 41, 43 and associate end openings 45, 47. The valve body also has an initially open interior 49. A flow control mechanism (shown generally at 51 in FIG. 3) is located within the interior 49 of the valve body 37 which allows the flow of fluids in a first direction (indicated by the arrows in FIG. 4) and which prevents the flow of fluids in a second opposite direction.

The flow control mechanism shown in FIG. 3 is a "check valve" of the type previously discussed. In other words, it allows flow in one direction but prevents in a second, opposite position. It is not subject to external regulation but is self regulating and presents no leak points to the environment. The back flow prevention device thus operates without receiving any help external to the pipeline to perform its closure function. It does not give any external indication of its condition or operating mode. The device is expected to operate automatically and unfailingly under its own design and the influence (frictional drag and momentum) of the direction of fluid flow.

In the embodiment of FIG. 3, the check valve mechanism includes a cylindrical mounting portion 53 with a cylindrical exterior 55 which is sized to press-fit within the cylindrical interior 49 of the pipeline 37. Preferably, the cylindrical mounting portion 53 is formed of polyethylene giving it the same expansion and contraction characteristics as the surrounding body 37. In the particular embodiment of the check valve mechanism illustrated in FIG. 3, a nylon plate element 57 is carried on a nylon shaft 59 within bore 60 and is biased by means of a return spring 61 toward the closed position. The valve mechanism is shown in the open position in FIG. 3, allowing flow in the directions of the arrows. The plate element 57 has a contoured rear surface 63 designed to engage and seal against a seat region 65 of the mounting portion 53. O-ring seals 67 and 69 provide increased sealing security for the assembly. The ring elements 71, 73 illustrated in FIG. 3 are intended to represent the butt fusion step in which heating elements are used to fuse the ends 43 of the conduit 37 and adjacent pipe sections in the piping system.

Figure 2B:
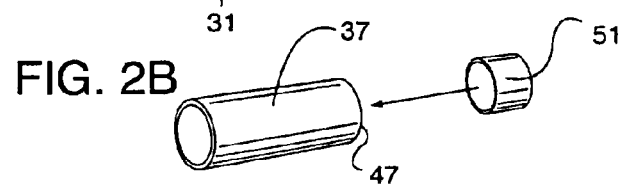
Figure 2C:
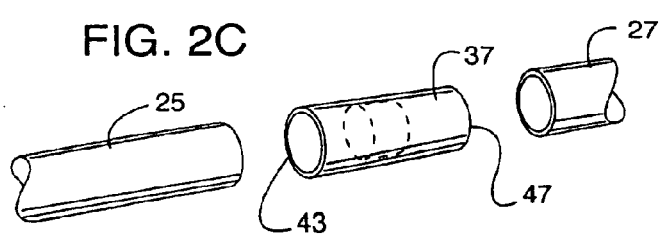

Returning to FIGS. 2B–2D, the steps of installing the flow control mechanism 51 are illustrated. As shown in FIG. 2B, the flow control mechanism 51 is press-fit within one end opening 47 of the valve body 37. By appropriately sizing the cylindrical mounting portion 53, the mounting portion can be forced within the end opening 47 and "press-fit" within the open interior 49. It is not generally necessary to heat or in any way "bell" the surrounding pipe in order to accomplish the press-fit. FIG. 2C shows the flow control mechanism 51 in dotted lines within the valve body 37. The valve body 37 is then installed within the pipe line system, preferably by a heat fusion technique, such as by butt fusing or electrofusing the opposing ends 41, 43 between the adjoining pipe sections 25, 27.

Figure 2D:
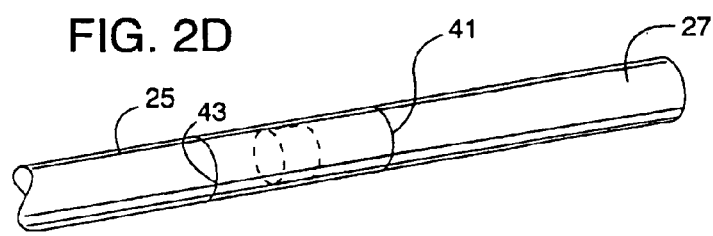

While the method illustrated in FIGS. 2B–2D, utilizes a separate valve body 37 which could be factory assembled, it will be understood that the flow control mechanism 51 could be field installed within the end opening of a section of the piping. In that case, it would be necessary to butt fuse only the pipe end containing the flow control mechanism to the end of the adjacent section of piping.

In the embodiment of FIG. 3, the flow control mechanism is a co-axial spring assisted piston type check valve. However, the invention is not limited to a specific type of check valve. A number of other designs will be familiar to those skilled in the art. For example, other check valve designs include but are not limited to the following types:

(1) swing type check valves including the single disk, and dual disk design;
(2) the slant disk check valve;
(3) the lift check valve including the poppet, disk/piston and ball varieties;
(4) the flap check valve;
(5) the foot check valve including the swing, lift and single ball varieties;
(6) the control disk check valve;
(7) the wafer style capper check valve;
(8) the WYE check valve; and
(9) the globe type check valve.

It is only necessary for purposes of the present invention that the check valve mechanism be co-axially and preferably press-fit installed and that the valve mechanism be formed entirely or at least primarily of synthetic materials which are compatible with the materials of the remainder of the pipeline system. For example, with reference to the embodiment of FIG. 3, all of the components of the check valve mechanism are formed of synthetic materials such as polyethylene and nylon. The spring element 61 can be, for example, a Teflon coated metal or can even be a non-metallic fiber glass spring. Because a check valve may operate only at infrequent intervals, it cannot be subject to inoperability due to corrosion byproducts which may freeze the mechanical parts from proper motion and function. Thus, the components of the check valve mechanism of the invention are constructed of non-corroding materials. While certain non-corroding metal alloys may be used with components such as the mechanical spring, the material of construction for the valve body and cylindrical mounting portion 53 are preferably thermoset or thermoplastic with the most preferred materials being thermoplastics such as polyethylene.

The embodiment of the invention shown in FIG. 3 is co-axial with the pipeline system but presents at least a slight restriction in flow due to the presence of the cylindrical mounting portion 53 within the pipeline interior. As shown in FIG. 4, the cylindrical mounting portion 53 has flow openings 71, 73 and 75 to provide a balanced flow path through the assembly. However, as illustrated in FIG. 5, it is also possible to provide a specialized valve body 77 which provides a "full-bore" flow path through the system. In the example of FIG. 5, the body 77 includes a region 79 of increased internal diameter.

In the embodiment of the invention illustrated in FIG. 5, the plate element 81 again rides on a shaft 83 which is carried within the mounting portion 85. The coil spring 87 spring biases the sealing surface 89 in the direction of the mating surface 91 of the surrounding valve body. The increased internal diameter presented by the region 79 provides a cross-sectional flow diameter which can be appropriately sized so that no flow restriction is presented by the valve mechanism.

An invention has been provided with several advantages. The back flow prevention device of the invention and its method of installation eliminates the need for mechanical connections in the pipeline which would be subject to potential leaks from gaskets, loose bolts or threads or degraded seals. In its preferred form, the back flow prevention device is formed entirely of non-corroding materials and can be connected to a straight run of pipe by welded or bonded joints, i.e., by butt fusion or electrofusion for thermoplastics or by fiberglass overwrapping for FRP piping.

Because check valves basically seal from fluid back pressure, at low pressures the sealing forces are low, thereby increasing the potential for leakage. The present design includes seal elements that are geometrically rounded or truncated such that at low back pressure, the seal contact area is proportionately reduced, giving a contact seal with a high interfacial pressure, i.e., low pressure divided by very small area equals high facial sealing pressure. The design thus provides a compliant seal mechanism that self compensates for low fluid back pressure. High fluid back pressure imposes greater deformation of the geometrical compliant seal, providing a larger contact area under high fluid force to give the necessary interfacial seal pressure.

The back flow prevention device as shown and claimed is preferably formed entirely or primarily from thermoplastics and/or thermoset synthetic materials, most preferably a polyolefin such as polyethylene. Certain fluids can adversely affect thermoplastics and cause "swelling." For example, hydrocarbon adsorption by the polyethylene material may produce swelling of the polymer matrix as lower molecular weight hydrocarbons diffuse into the polyethylene molecular structure. By fabricating the entire back flow prevention device from the same or compatible materials, all components expand uniformly, thus maintaining operability of the mechanism without mechanical lockup due to the changing dimensions produced by swelling. All of the components move together under the same chemical influences to maintain operability because the essential device components are formed of the same material.

A similar response is produced under the influence of heat and pressure. For example, in hydrocarbon oil gathering lines, the existence or paraffins in the pipeline fluid usually causes internal diameter reductions as the paraffins "plate out" on the ID wall of the pipeline. This reduces flow and increases pumping costs. To remedy this situation, operators usually inject hot oil into the flow line to melt the paraffins. The resultant rapid thermal expansion causes diametral dimensional changes in the pipeline components by thermal expansion. Because the major components of the pressure mechanism are formed from the same material, the components dimensionally move together to maintain operability of the valve mechanism.

In the preferred form of the invention, the cylindrical mounting portion of the flow control mechanism is inserted and retained within the surrounding pipeline in press-fit fashion. In other words, the surrounding body may be a short segment of the pipeline itself. In this manner, the tubular body of the check valve is the same material as the pipeline itself. The press fit installation utilizes the ductile properties of the polyethylene pipe itself. It is also possible that mechanical stops or registers, such as stop 50 in FIG. 3, can be utilized to further secure and hold the cylindrical mounting portion from axial movement under flow stream pressure conditions.

In its preferred form, the check valve mechanism features an orifice or orifices which are concentric or essentially concentric with the pipeline and tubular valve body. The design is thus in-line with no chambers and is co-axial with the pipeline itself.

The tubular valve body can be heat fused to the pipeline system without mechanical joints and therefore without leak potential. As a result, a monolithic pipeline construction is achieved. Because there are no external holes or shafts, there can be no undesireable emissions or external leak paths which could have undesireable environmental consequences.

While the invention has been shown in only one of its forms, it is not thus limited but is susceptible to various changes and modifications without departing from the spirit thereof.

What is claimed is:

1. A natural gas pipeline having a back flow prevention device installed therein, the natural gas pipeline being formed of polyethylene having a given external diameter and an interior, the back flow prevention device being formed primarily of plastic material compatible with the polyethylene pipeline, the combination comprising:

a check valve mechanism press-fit within the interior of a surrounding body making up a portion of pipeline and seated against a pre-existing register provided within the interior of the pipeline, the check valve mechanism allowing flow of fluids in a first direction and preventing the flow of fluids in a second, opposite direction;

wherein the surrounding body has opposing ends formed of a plastic material which is compatible with the polyethylene of the pipeline, and wherein the surrounding body has an external diameter which is substantially equal to that of the remainder of the pipeline, whereby the surrounding body can be installed in the pipeline in co-axial fashion by directly joining and fusing the opposing ends thereof to opposing mating pipe ends at a selected location within the pipeline.

2. The device of claim 1, wherein the valve body is formed of polyethylene.

3. A natural gas pipeline having a back flow prevention device installed therein, the natural gas pipeline being formed of polyethylene having a given external diameter, the combination comprising:

a valve body formed of polyethylene, the valve body having an exterior defined between opposing ends and associated end openings, the valve body also having an initially open, cylindrical interior;

a check valve mechanism located within the interior of the valve body and moveable between a first position which allows flow of fluids in a first direction and a second position which prevents the flow of fluids in a second, opposite direction, the check valve mechanism including a cylindrical mounting portion formed of polyethylene, thereby giving the mounting portion expansion and contraction characteristics indentical to those of the surrounding valve body, the cylindrical mounting portion having a cylindrical exterior of a diameter which can be slidably received within the initially open, cylindrical interior of the valve body and which is sized to be press-fit within the cylindrical interior of the valve body;

wherein the check valve mechanism also includes a movable plate element having a contoured rear surface which engages and seals against a seat region of the cylindrical mounting portion of the check valve mechanism to control the flow of fluid through the pipeline, the contoured rear surface of the plate element being geometrically truncated such that at low pressure, seal contact area is proportionately reduced, thereby producing a contact seal with a high interfacial pressure;

wherein the valve body with its opposing ends formed of polyethylene is compatible with the polyethylene of the pipeline, and wherein the valve body has an external diameter which is substantially equal to that of the remainder of the pipeline, whereby the valve body can be installed in the pipeline in co-axial fashion by directly joining and fusing the opposing ends thereof to opposing mating pipe ends at a selected location within the pipeline.

4. A method of installing a back flow prevention device within a hydrocarbon conveying, polyethylene pipeline having a given diameter, the pipeline being formed of pipe sections having a exterior and a generally cylindrical interior, the method comprising the steps of:

providing a check valve mechanism which is sized to be positioned within the interior of a selected section of the pipeline, the valve mechanism being moveable between a first position which allows flow of fluids in a first direction and a second position which prevents the flow of fluids in a second, opposite direction, the check valve mechanism including a cylindrical mounting portion formed of a polyethylene material with a cylindrical exterior which is sized to be press-fit within the cylindrical interior of the selected section of pipeline to thereby install the check valve mechanism at a desired location within the pipeline;

wherein the polyethylene material of the check valve mechanism is compatible with the polyethylene of the pipeline, whereby the check valve mechanism and pipeline materials tend to expand and contract at the same rate under the influence of temperature and pressure;

wherein the check valve mechanism also includes a moveable valve element which cooperates with the cylindrical mounting portion of the check valve mechanism to control the flow of fluid through the pipeline, and wherein the moveable element is also formed of a plastic material; and thereafter joining an exposed end of the section of pipeline containing the check valve mechanism to a next section of pipeline in co-axial fashion by heat fusing the respective ends of the sections of pipeline, the valve body having an external diameter which is substantially equal to that of the remainder of the polyethylene pipeline.

5. The method of installing a back flow prevention device within a pipeline formed primarily of plastic material, the pipeline being formed of pipe sections having an exterior and a generally cylindrical interior, the method comprising the steps of:

providing a check valve mechanism which is sized to be positioned within the interior of a selected section of the pipeline, the valve mechanism being moveable between a first position which allows flow of fluids in a first direction and a second position which prevents the flow of fluids in a second, opposite direction, the check valve mechanism including a cylindrical mounting portion formed of a plastic material with a cylindrical exterior which is sized to be press-fit within the cylindrical interior of the selected section of pipeline to thereby install the check valve mechanism at a desired location within the pipeline;

wherein at least the cylindrical mounting portion of the check valve mechanism is formed of a plastic material which is compatible with the plastic material of the pipeline, whereby the check valve mechanism and the pipeline materials tend to expand and contract at the same rate under the influence of temperature and pressure;

thereafter joining an exposed end of the section of pipeline containing the check valve mechanism to a next section of pipeline in co-axial fashion by heat fusing the respective ends of the sections of pipeline;

wherein the check valve mechanism also includes a moveable valve element which cooperates with the cylindrical mounting portion of the check valve mechanism to control the flow of fluid through the pipeline, and wherein both the moveable element and the cylindrical mounting portion of the mechanism are formed of plastic materials; and wherein the cylindrical mounting portion is formed of polyethylene and the moveable element is formed of nylon.

* * * * *